United States Patent [19]

Hutchison

[11] 4,450,673

[45] May 29, 1984

[54] MULCHING MOWER

[76] Inventor: Marion E. Hutchison, 2148 Touchae St., Waterloo, Iowa 50703

[21] Appl. No.: 310,702

[22] Filed: Oct. 13, 1981

Related U.S. Application Data

[63] Continuation of Ser. No. 177,276, Aug. 11, 1980, abandoned.

[51] Int. Cl.³ .................. A01D 35/00; A01D 53/08
[52] U.S. Cl. .................................. 56/17.5; 56/17.1; 56/16.9; 56/13.4
[58] Field of Search ............ 56/13.7, 13.4, 255, 56/295, 320.1, 320.2, 17.1, 17.5, 16.7, 503, 16.9

[56] References Cited

U.S. PATENT DOCUMENTS

| | | | |
|---|---|---|---|
| 2,957,295 | 10/1960 | Brown | 56/13.4 |
| 3,129,549 | 4/1964 | Stauffer | 56/25.4 |
| 3,473,306 | 10/1969 | Ewasko | 56/17.5 |
| 3,563,014 | 2/1971 | Krewson | 56/17.5 |
| 4,069,651 | 1/1978 | Steffen | 56/320.1 |

FOREIGN PATENT DOCUMENTS 565295 3/1958 Belgium ......................... 56/320.2

Primary Examiner—Gene Mancene
Assistant Examiner—John G. Weiss
Attorney, Agent, or Firm—Dean P. Edmundson

[57] ABSTRACT

A rotary mower has an engine supported by an engine platform secured to a frame having wheels and a handle, the engine has an output drive shaft which has a cutting blade rigidly secured at its end, a counter-rotating housing overlies the blade and is rotated in a direction opposite to the blade by a transmission means, the transmission means has a drive pulley rigidly secured to the output drive shaft, a pair of idler pulleys rotationally supported by the engine platform, a driven pulley rotationally supported by the drive shaft, and an endless belt trained from the drive pulley through the idler pulleys to the driven pulley, the counter-rotating housing is rigidly affixed to the driven pulley.

21 Claims, 8 Drawing Figures

MULCHING MOWER

This application is a continuation application of Ser. No. 177,276 filed Aug. 11, 1980, now abandoned.

BACKGROUND OF THE INVENTION

The present invention relates to rotary lawn mowers in general, and more particularly, to mulching mowers.

The rotary power lawn mower commonly in use by homeowners for lawn maintenance during the last twenty-five years was originally a side discharge machine which deposited the clippings to one side (usually the operator's right). In order to eliminate what under some conditions could be an unsightly windrow of clippings, some mowers have been equipped with bags to catch the grass which the operator had to empty. This represented an added work load for the homeowner, but one which was increasingly acceptable as the community standards for lawn care and appearance have been raised.

In an effort to reduce the work load without degrading the appearance of the lawn, several manufacturers have introduced mulching mowers which attempt to deposit the cut grass directly in the swath traversed by the mower in such a manner that the clippings are not noticeable. These mowers perform best in grass which is dry, not too tall, and relatively sparse. Under certain conditions, the grass being cut has a tendency to stick to the underside and walls of the mower housing and either build-up to the point where the mower stalls or the grass falls off in irregular and unsightly clumps. This tendency is influenced by the type of grass being cut, maturity of the grass plant, moisture content, and housing design, among other factors. Most difficulty in mulching mowers is encountered with lush, fast growing grasses in the spring of the year.

Since the common mulching mower does not have any fixed discharge point, grass clippings may not always leave the mower housing as rapidly as they are entering it. Such an unsteady flow condition may be caused by wet or sticky grass which adheres to the housing walls and inhibits the normal material flow. If the input flow rate exceeds the output flow rate then there must be an accumulation of grass clippings within the housing which is equal to the difference between the two flows. Some of the clippings retained in the housing under these conditions may adhere to the housing walls and will be stationary. In addition, there will always be clippings which will be in motion, carried above the blade partly by aerodynamics and partly by mechanical forces exerted by the rotating blade. Significant engine power is required to hold these clippings in suspension. As more clippings accumulate in the housing, the power requiremen to hold them above the blade increases. When a critical point is reached, the power required is greater than the power available from the engine. The instant this critical point is reached the operator will sense a decay in engine speed. It is instinctive but useless to arrest or slow the forward progress of the mower through the grass. The material held in in suspension by the dynamic forces associated with blade rotation has already started to settle downward through the plane of cut of the blade which cause and even greater power demand and more abrupt slowing of blade speed. The engine stalls within a few seconds when this unstable condition is reached, and the grass which was in motion above the blade is deposited in a mass on the ground under the mower. The grass which adhered to the underside and walls of the housing is probably still mostly there, and if not removed, will cause stalling even more rapidly when the engine is re-started.

There is, therefore, a need for a structure which prevents the build-up of wet clippings within the mower housing, promotes even distribution of the cuttings, and provides for more steady, unimpeded operation of the mower to reduce power requirements and improve fuel efficiency.

SUMMARY OF THE INVENTION

The present invention eliminates the above-described problems of the prior art by providing a rotating housing above the cutting blade. By providing a toroidal-shaped housing having a low center portion and a raised peripheral portion, the air flow is concentrated in the outer peripheral portion of the housing at the sharpened edges of the cutting blade which improves the quality of cut. The housing has sloping outer walls which assist in quickly distributing the cuttings, and thus, retention of the cuttings within the housing is prevented. Windrowing is also eliminated by the present invention. Where the cutting blade rotates counterclockwise, windrow clippings tend to accumulate on the right side of the mower. By rotating the housing in a direction opposite to the blade, a reversely directed mechanical impetus can be applied to the cuttings which tends to force them back in the opposite direction, eliminating the windrowing on the right side of the mower, and providing for a more even distribution of the cuttings. Furthermore, the rotation of the housing prevents the grass from sticking to its interior surface. Thus, the present invention provides for a steady, continuous flow of clippings through the housing, evenly distributing them upon the cut lawn, while minimizing power requirements.

It is, therefore, an object of the present invention to provide a mower which ensures a steady, continuous flow of clippings through the housing.

It is another object of the present invention to provide a mulching mower structure which reduces the power requirements of the engine by preventing the build-up of clippings within the mower housing.

Yet another object of the present invention is to provide a mulching mower which evenly distributes the grass cuttings.

These and other objects, advantages, and novel features of the present invention will become apparent from the following detailed description of the invention taken in conjunction with the accompanying drawings.

DESCRIPTION OF THE PREFERRED EMBODIMENTS

Figure 1:
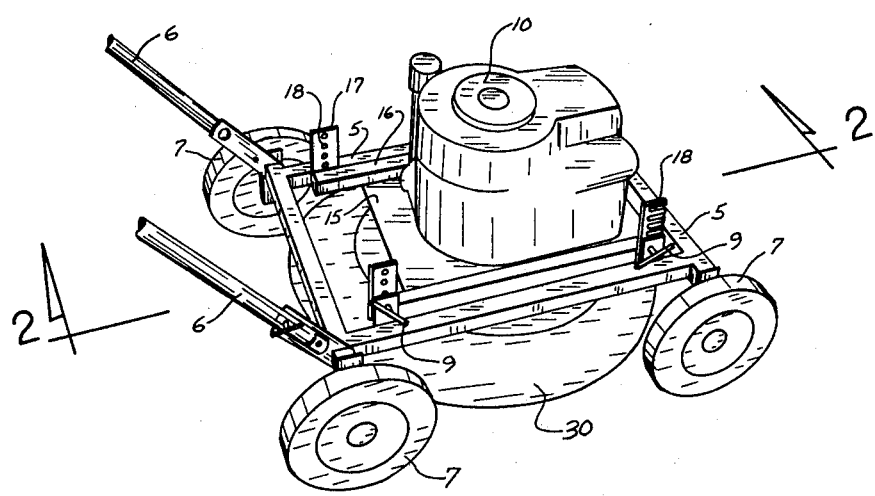
FIG. 1 is a perspective view of the rotary mower of the present invention.
Figure 2:
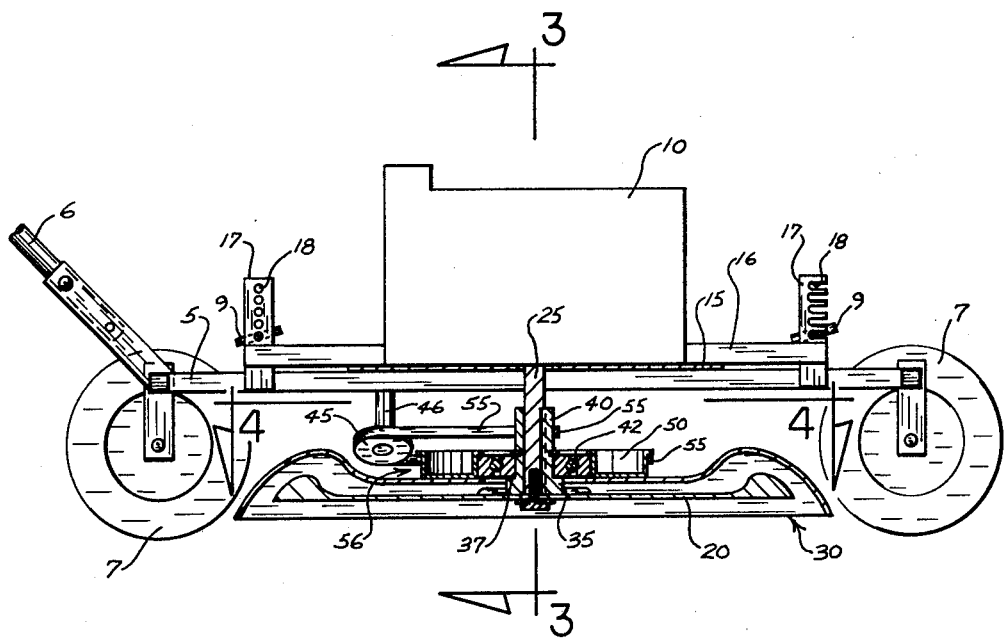
FIG. 2 is a cross-sectional, elevational view of the present invention taken along line 2—2 of FIG. 1.

The present invention comprises an improvement on a conventional rotary lawn mower. The conventional rotary mower has a frame 5 supporting an engine 10 which rotates a cutting blade 20 at high speed via an output drive shaft 25. The improvement of the present invention comprises a counter-rotating housing 30 positioned above the cutting blade 20 and powered by a transmission means 56 to rotate the housing 30 in a direction opposite to the cutting blade 20.

Now, describing the invention in detail, and with particular reference to FIGS. 1-4, the frame 5 is rectangular in shape and is rigidly connected to a handle means 6 at its rearward side, and has a wheel 7 rotatably supported at each of its corners. The frame 5 also includes four upstanding pin tabs 8 which serve a purpose later described.

It is to be understood that the particular design of the frame disclosed is only to facilitate description and does not form a part of this invention.

The engine of the present structure is denominated by the numeral 10 and is only symbolically shown in that it is a conventional element commonly of the gasoline powered type. Engine 10 is supported by a rectangular engine platform 15. The rectangular platform 15 has a pair of side rails 16, and each of the rails 16 has an upstanding adjustment tab 17 at each of its ends. The tabs 17 include a plurality of vertically arranged adjustment apertures 18 for adjusting the relative height of the engine and mower assembly with respect to the frame.

Figure 3:
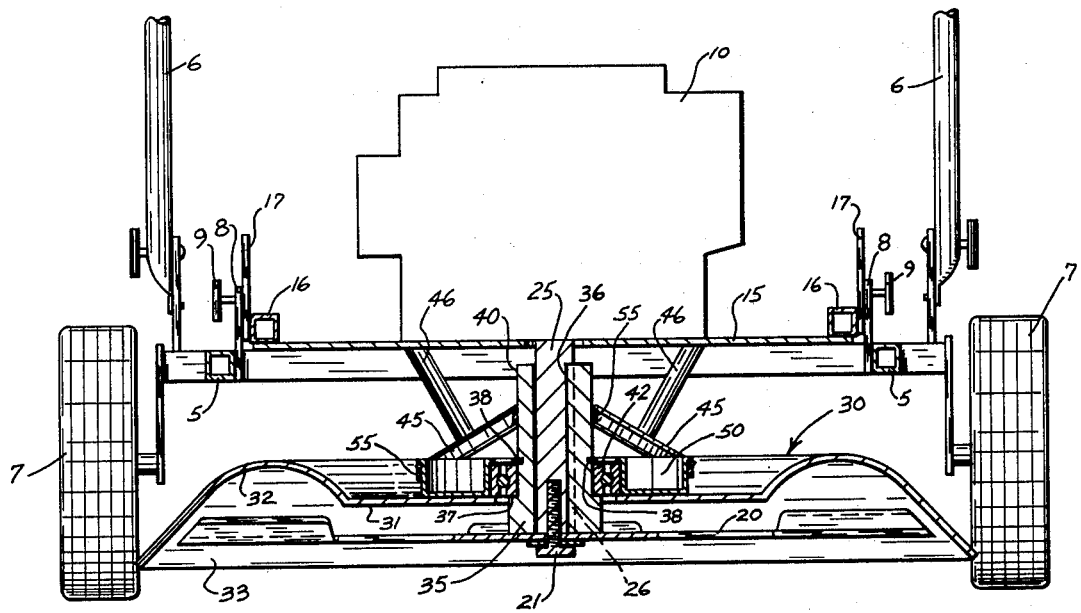
FIG. 3 is a cross-sectional, elevational view of the present invention taken along line 3—3 of FIG. 2.

The engine 10 is supported by the frame 5 as best shown in FIG. 3. The engine platform assembly 10, 15, 16, 17 is suitably dimensioned in width to be received within the frame 5, with the adjustment tabs 17 interfacing cooperatively with the corresponding pin tabs 8. Each of the pin tabs 8 supports a horizontally adjustable pin 9. Each of the pins 9 is received within a corresponding adjustment aperture 18 of the tabs 17 to secure the engine platform assembly 10, 15, 16, 17 upon the frame 5.

Engine 10 has an output drive shaft 25 which is rotated at high speeds by the engine 10. Shaft 25 supports a cutting blade 20, secured by a bolt 21 in the conventional manner.

Figure 4:
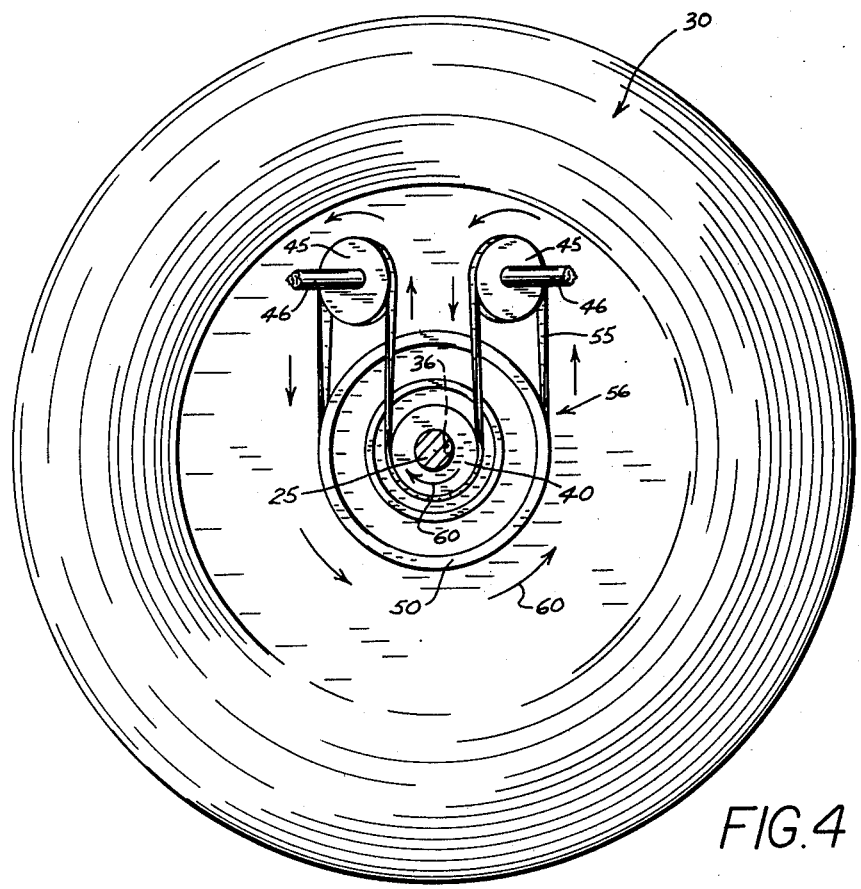
FIG. 4 is a cross-sectional plan view taken along line 4—4 of FIG. 2.

Turning now to the improvement which comprises the present invention, and with particular reference to FIGS. 3 and 4, the shaft 25 has a keyway 26. A collar shaped hub 35 has a mating key 36 which is received within keyway 26 as the hub 35 is slideably received upon the shaft 25. A bolt 21 which secures the cutting blade 20 retains the hub 35 upon the shaft 25. Hub 35 includes a shoulder 37 which supports the lower edge of a bearing 42. A snap ring 38 is installed on the hub 35 to secure the bearing 42 at its upper edge. The upper portion of hub 35 comprises a drive pulley 40.

The bearing 42 supports a driven pulley 50 upon its outer periphery. Driven pulley 50, in turn, supports and is rigidly connected to counter-rotating housing 30 upon its underside by suitable fasteners (not shown).

FIGS. 3 and 4 show a pair of idler pulleys 45. Each of the idler pulleys 45 is rotationally supported by a pulley shaft 46 which is rigidly secured at one end to the underside of the engine platform 15. The shafts 46 support idler pulleys 45 in a slightly angled relationship with respect to the pulleys 40, 50 as shown. An endless belt 55 is threaded from the drive pulley 40 through the idler pulleys 45 and then to the driven pulley 50 in the manner best shown in FIG. 4. A study of FIG. 4 and its associated arrows 60 reveals that the rotation of drive pulley 40 as transmitted by belt 55 through the idler pulleys 45 imparts an oppositely directed rotation to the driven pulley 50. The pulleys 40, 45, 50 and belt 55 thus comprise a transmission means 56 which transmits the rotation of the drive shaft 25 to the counter-rotating housing 30. FIG. 3, moreover, reveals that this opposite rotation of driven pulley 50 with relation to the output drive shaft 25 is permitted by the bearing connection 42 between the pulley 50 and the shaft 25. This oppositely directed rotation of the driven pulley 50 is, of course, directly transmitted to the rigidly affixed counter-rotating housing 30. Hence, it can be readily appreciated, that the above-described lawn mower structure provides an overlying housing 30 which rotates in a direction opposite to the cutting blade 20.

It is observed that the belt 55 must be symmetrical so that it can transmit power with both faces. While various belt designs are suitable to accomplish this purpose, a flat belt has been disclosed.

The housing 30, in its preferred embodiment, is toroidal in interior surface contour, having a lower flat center 31 and a raised curved periphery 32 which slopes outwardly and downwardly, and has a lower edge 33 which extends below the blade 20 to completely enclose blade 20 across its top and around its sides.

As noted above, the toroidal shape reduces the vortex area above the blade preventing the collection of cuttings there, while the counter-rotation of the housing prevents the grass from sticking and imparts a reversely directed mechanical impetus to the cuttings which tends to force them in the opposite direction to the blade, eliminating the windrowing problem. The downward and outward slope of the outer wall of the housing 30 facilitates the even distribution of the cuttings and the steady state flow of cuttings through the housing 30.

Having, thus, disclosed the preferred embodiment of the present invention various alternative embodiments are also within its teachings and the contemplation of the applicant as will now be described.

Figure 5:
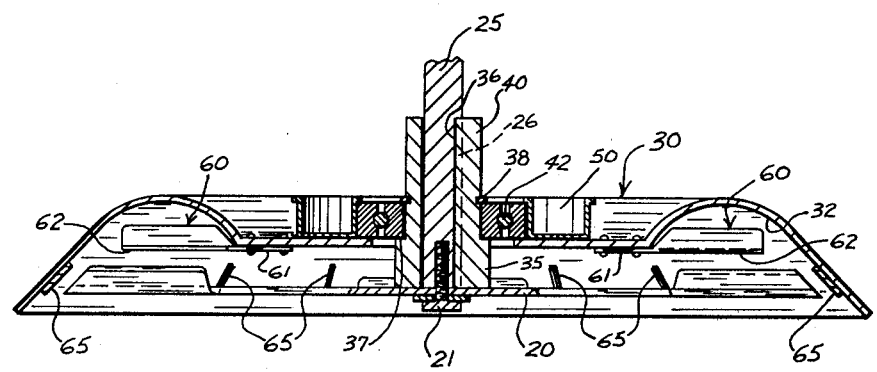
FIG. 5 is a cross-sectional, elevational view of an alternate embodiment of the present invention.

FIG. 5 shows an embodiment of the present invention wherein cutting members 60 are affixed to the counter-rotating housing 30. Each of the blades 60 has a base portion 61 and a blade portion 62. The base portion 61 is suitably secured to the central portion 31 of the housing 30 so that the blade portion 32 extends into the raised peripheral portion 32. It can readily be appreciated that the addition of the cutting members 60 will tend to reduce the size of the clippings. Another variation shown in FIG. 5 is the inclusion of small bar members 65 equidistantly spread along and secured to the interior surface of the housing 30. These bar members 65 are intended to impart a greater mechanical impetus to the grass clippings to aid in throwing them outwardly and downwardly. The bars 65 thus comprise a mechanism for mechanically contacting the grass and assisting in its outward and downward discharge from the housing 30. Of course, the members 65 will be suitably dimensioned and positioned so as not to obstruct the blade 20.

Figure 6:
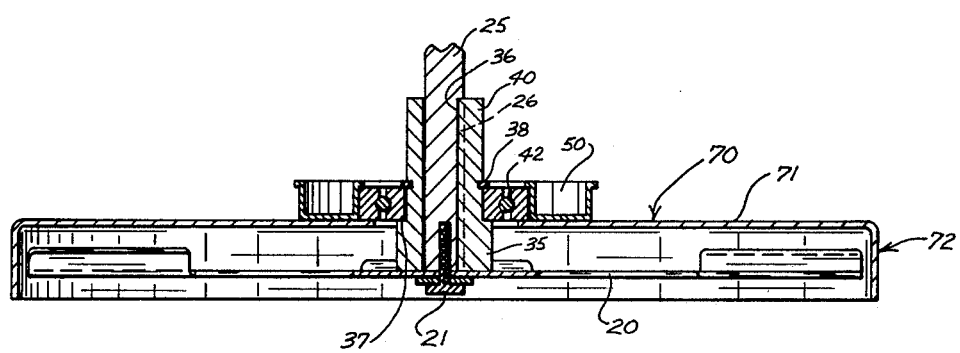
FIG. 6 is a cross-sectional, elevational view of an alternate embodiment of the present invention.

FIG. 6 shows an alternate embodiment of the present invention employing an upside-down, pan-shaped counter-rotating housing 70. The housing 70 has a flat circular top 71, and a normal, downwardly disposed circular wall 72.

Figure 7:
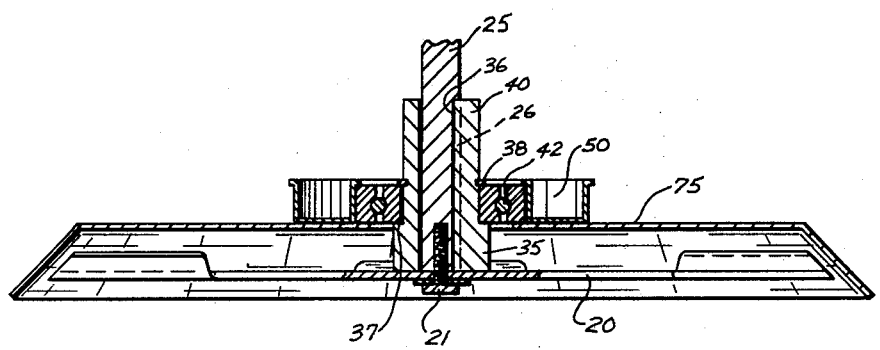
FIG. 7 is a cross-sectional, elevational view of an alternate embodiment of the present invention.
Figure 8:
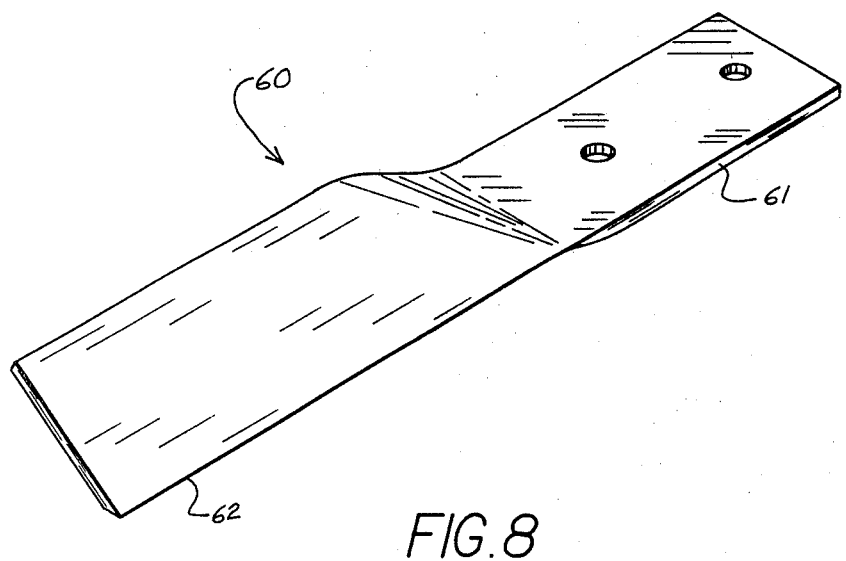
FIG. 8 is a perspective view of a supplementary cutting blade as shown in FIG. 5.

FIG. 7 shows an alternate embodiment of the present invention comprising a truncated conically-shaped counter-rotating housing 75.

The above alternative embodiments of the present invention are intended to be illustrative of the present invention and as examples of the types of structures embodied within its teachings. Accordingly, the invention is not intended to be limited to the specific details disclosed.

Having, thus, disclosed the preferred embodiment of the present invention, as well as a number of alternate embodiments, it is intended to be understood that various modifications and variations thereof would be obvious to one of ordinary skill in the art in light of its teachings and that the same are intended to be included within the scope of the invention. It is, therefore, to be appreciated that, within the scope of the appended claims, the invention may be practiced otherwise than as specifically described.

I claim:

1. In a rotary mower having an engine and a cutting blade for cutting blades of grass, said engine having an output drive shaft and said blade being rigidly secured to said output shaft so that said blade rotates with said drive shaft in a first direction, the improvement comprising:
   a housing rotationally secured coaxially on said output drive shaft above said cutting blade, said housing having a central portion, and a continuous peripheral edge disposed downwardly to a point lower than said cutting blade; and
   a means for rotating said housing relative to said output drive shaft so as to impart sufficient centrifugal force to the cut blades of grass to impel the blades of grass outwardly and downwardly with respect to said housing; wherein said means for rotating said housing comprises means for transmitting rotational motion from said output drive shaft to said housing.

2. The rotary mower of claim 1 wherein said housing is a counter-rotating housing, and wherein said rotating means is a means for rotating said counter-rotating housing in a second direction opposite to said first direction.

3. The rotary mower of claim 2 wherein said engine is supported upon an engine platform, and wherein said transmission means comprises a drive pulley rigidly secured to said output drive shaft, a pair of idler pulleys rotationally secured to said engine platform, a driven pulley rotationally secured to said output drive shaft, and an endless belt train from said drive pulley through said idler pulleys to said driven pulley, said counter-rotating housing being rigidly secured to said driven pulley.

4. The rotary mower of claim 3 wherein said drive pulley lies in a first plane, said driver pulley lies in a second plane parallel to said first plane, and wherein said idler pulleys lie in planes acutely oriented with respect to said second plane.

5. The rotary mower of claim 2 wherein said counter-rotating housing comprises a toroidal-shape housing having a raised outer peripheral portion and a lower center portion.

6. The rotary mower of claim 5 further comprising a cutting member secured to said toroidal housing, said cutting member having a base portion and a blade portion, said base portion being secured to said center portion, and said blade portion extending into said raised peripheral portion.

7. The rotary mower of claim 2 further comprising a cutting member secured to said counter-rotating housing.

8. The rotary mower of claim 2 wherein said counter-rotating housing is pan-shaped having a flat, circular top and a normal, downwardly disposed circular side wall.

9. The rotary mower of claim 2 wherein said counter-rotating housing has a truncated conical shape.

10. The rotary mower of claim 2 further comprising a grass clipping discharge facilitating means disposed on the interior surfact of said counter-rotating housing for assisting in distributing the grass clipping outwardly and downwardly from said counter-rotating housing.

11. A rotary mower comprising:
    a frame;
    a housing rotatably attached to said frame, said housing having a central portion, and a continuous peripheral edge disposed downwardly to a point lower than a cutting blade disposed beneath said housing;
    housing rotating means for rotating said housing with respect to the frame; and
    blade rotating means for rotating said cutting blade with respect to said frame, to cut blades of grass and impel them against said rotating housing,
    wherein said housing rotating means is adapted to rotate said housing at an an angular velocity such that sufficient centrifugal force is imparted to said cut blades of grass to impel the blades of grass outwardly and downwardly from said housing via centrifugal force.

12. The mower of claim 11 wherein the axis of the housing is the same axis of rotation as the axus of rotation of said cutting blade.

13. The mower of claim 11 including means for causing the direction of rotation of the housing to be opposite to the direction of rotation of said cutting blade.

14. The rotary mower of claim 13 including a drive shaft operably connected to said housing rotating means and said blade rotating means by a transmission means, wherein said transmission means comprises:
    a drive pulley rigidly secured to said drive shaft, a pair of idler pulleys rotationally secured to said frame, a driven pulley rotationally secured to said drive shaft, and an endless belt trained from said drive pulley through said idler pulleys to said driven pulley, said housing being rigidly secured to said driven pulley.

15. The rotary mower of claim 14, wherein said drive pulley lies in a first plane, said driver pulley lies in a second plane parallel to said first plane, and wherein said idler pulleys lie in planes acutely oriented with respect to said second plane.

16. The rotary mower of claim 11 wherein said housing is a toroidal-shaped, having a raised outer peripheral portion and a lower center portion.

17. The rotary mower of claim 16 further comprising a cutting member secured to said toroidal-shaped housing, said cutting member having a base portion and a blade portion, said base portion being secured to said lower center portion and said blade portion extending into said raised outer peripheral portion.

18. The rotary mower of claim 11 further comprising a cutting member secured to said housing.

19. The rotary mower of claim 11 wherein said housing is pan-shaped, having a flat, circular top and a normal, downwardly disposed circular side wall.

20. The rotary mower of claim 11 wherein said housing has a truncated conical shape.

21. The rotary mower of claim 11 further comprising a grass clipping discharge facilitating means disposed on the interior surface of said housing for assisting in distributing the grass clippings outwardly and downwardly from said housing.

* * * * *